(12) United States Patent
Grier et al.

(10) Patent No.: US 8,612,481 B2
(45) Date of Patent: Dec. 17, 2013

(54) SYSTEM AND METHOD FOR PROXYING DATA ACCESS COMMANDS IN A STORAGE SYSTEM CLUSTER

(75) Inventors: James R. Grier, Groton, MA (US); Vijayan Rajan, Mountain View, CA (US); John Meneghini, Billerica, MA (US); Arthur F. Lent, Newton, MA (US)

(73) Assignee: NetApp, Inc., Sunnyvale, CA (US)

( * ) Notice: Subject to any disclaimer, the term of this patent is extended or adjusted under 35 U.S.C. 154(b) by 798 days.

(21) Appl. No.: 12/029,264

(22) Filed: Feb. 11, 2008

(65) Prior Publication Data

US 2008/0133852 A1   Jun. 5, 2008

Related U.S. Application Data

(62) Division of application No. 11/118,299, filed on Apr. 29, 2005.

(51) Int. Cl.
*G06F 17/30* (2006.01)

(52) U.S. Cl.
USPC ........... 707/781; 707/706; 707/713; 707/722; 707/736; 707/758; 709/219; 709/230

(58) Field of Classification Search
USPC ................. 707/706, 713, 722, 736, 758, 781, 707/999.01; 709/219, 230
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,633,999 A | 5/1997 | Clowes et al. | |
| 5,781,770 A | 7/1998 | Byers et al. | |
| 5,802,366 A | 9/1998 | Row et al. | |
| 5,812,748 A | 9/1998 | Ohran et al. | |
| 5,812,751 A | 9/1998 | Ekrot et al. | |

(Continued)

FOREIGN PATENT DOCUMENTS

| | | | |
|---|---|---|---|
| EP | 1357476 A2 | 10/2003 | |
| WO | WO-2005/029251 A2 | 3/2005 | |
| WO | WO2005/029251 A2 | 3/2005 | |

OTHER PUBLICATIONS

Notification of Transmittal of The International Search Report and the Written Opinion of the International Searching Authority, or the Declaration, PCT/US2005/042173, Nov. 21, 2005.

(Continued)

*Primary Examiner* — Syling Yen
(74) *Attorney, Agent, or Firm* — Cesari and McKenna, LLP

(57) ABSTRACT

A system and method proxies data access commands acrossed a cluster interconnect between storage appliances and a cluster using a file-level protocol. Each storage appliance activates two ports per data access, a local port for data access requests directed to clients of the storage appliance and a proxy port for data access requests directed to the partner storage appliance. Clients utilizing multi-pathing software may send data access requests to either the local port of the storage appliance or the proxy port of the storage appliance. The system and method improves high availability, especially during a loss of connectivity due to non-storage appliance hardware failure.

25 Claims, 16 Drawing Sheets

(56) References Cited

U.S. PATENT DOCUMENTS

| | | | |
|---|---|---|---|
| 5,819,292 A | 10/1998 | Hitz et al. | |
| 5,892,955 A | 4/1999 | Ofer | |
| 5,894,588 A | 4/1999 | Kawashima et al. | |
| 5,931,918 A | 8/1999 | Row et al. | |
| 5,941,972 A | 8/1999 | Hoese et al. | |
| 5,951,695 A | 9/1999 | Kolovson | |
| 5,963,962 A | 10/1999 | Hitz et al. | |
| 5,975,738 A | 11/1999 | DeKoning et al. | |
| 6,038,570 A | 3/2000 | Hitz et al. | |
| 6,065,037 A | 5/2000 | Hitz et al. | |
| 6,119,244 A | 9/2000 | Schoenthal et al. | |
| 6,128,734 A | 10/2000 | Gross et al. | |
| 6,173,293 B1 | 1/2001 | Thekkath et al. | |
| 6,173,374 B1 | 1/2001 | Heil et al. | |
| 6,292,905 B1 | 9/2001 | Wallach et al. | |
| 6,425,035 B2 | 7/2002 | Hoese et al. | |
| 6,606,690 B2 | 8/2003 | Padovano | |
| 6,625,749 B1 | 9/2003 | Quach | |
| 6,636,879 B1 | 10/2003 | Doucette et al. | |
| 6,643,654 B1 | 11/2003 | Patel et al. | |
| 6,654,902 B1 | 11/2003 | Brunelle et al. | |
| 6,671,773 B2 | 12/2003 | Kazar et al. | |
| 6,708,265 B1 | 3/2004 | Black | |
| 6,721,764 B2 | 4/2004 | Hitz et al. | |
| 6,728,897 B1 | 4/2004 | Cramer et al. | |
| 6,757,695 B1 | 6/2004 | Noveck et al. | |
| 6,760,304 B2 | 7/2004 | Uzrad-Nali et al. | |
| 6,775,702 B2 | 8/2004 | Oeda et al. | |
| 6,868,417 B2 | 3/2005 | Kazar et al. | |
| 6,868,438 B2 | 3/2005 | Fujimoto | |
| 6,877,109 B2 | 4/2005 | Delaney et al. | |
| 6,912,627 B2 | 6/2005 | Matsunami et al. | |
| 6,915,389 B2 | 7/2005 | Fujimoto | |
| 6,978,283 B1 | 12/2005 | Edwards et al. | |
| 7,003,634 B2 | 2/2006 | Takeda et al. | |
| 7,038,058 B2 | 5/2006 | Rust et al. | |
| 7,107,385 B2 | 9/2006 | Rajan et al. | |
| 7,165,258 B1 * | 1/2007 | Kuik et al. | 719/326 |
| 7,181,439 B1 | 2/2007 | Lent et al. | |
| 7,184,445 B2 | 2/2007 | Gupta et al. | |
| 7,194,597 B2 | 3/2007 | Willis et al. | |
| 7,210,061 B2 | 4/2007 | Anderson | |
| 7,213,045 B2 | 5/2007 | Uzrad-Nali | |
| 7,231,412 B2 | 6/2007 | Hitz et al. | |
| 7,260,678 B1 | 8/2007 | Agarwal et al. | |
| 7,260,737 B1 | 8/2007 | Lent et al. | |
| 7,296,068 B1 | 11/2007 | Sarma et al. | |
| 7,340,639 B1 | 3/2008 | Lee et al. | |
| 7,409,494 B2 | 8/2008 | Edwards et al. | |
| 7,451,163 B2 | 11/2008 | Selman et al. | |
| 7,467,191 B1 | 12/2008 | Wang et al. | |
| 7,523,201 B2 | 4/2009 | Lee et al. | |
| 2002/0078174 A1 * | 6/2002 | Sim et al. | 709/219 |
| 2002/0078371 A1 | 6/2002 | Heilig et al. | |
| 2002/0165941 A1 * | 11/2002 | Gahan et al. | 709/219 |
| 2003/0061491 A1 | 3/2003 | Jaskiewicz et al. | |
| 2003/0101239 A1 * | 5/2003 | Ishizaki | 709/219 |
| 2003/0115350 A1 | 6/2003 | Uzrad-Nali et al. | |
| 2003/0120743 A1 | 6/2003 | Coatney et al. | |
| 2004/0030668 A1 | 2/2004 | Pawlowski et al. | |
| 2004/0064815 A1 | 4/2004 | Uzrad-Nali et al. | |
| 2004/0078467 A1 | 4/2004 | Grosner et al. | |
| 2004/0139145 A1 | 7/2004 | Bar-or et al. | |
| 2004/0156393 A1 | 8/2004 | Gupta et al. | |
| 2004/0193795 A1 * | 9/2004 | Takeda et al. | 711/113 |
| 2004/0205143 A1 | 10/2004 | Uemura | |
| 2004/0268017 A1 | 12/2004 | Uzrad-Nali et al. | |
| 2005/0097260 A1 | 5/2005 | McGovern et al. | |
| 2005/0125503 A1 | 6/2005 | Iyengar et al. | |
| 2005/0235107 A1 * | 10/2005 | Ohno et al. | 711/112 |
| 2006/0184587 A1 | 8/2006 | Federwisch et al. | |

OTHER PUBLICATIONS

U.S. Appl. No. 11/118,299, filed Apr. 29, 2005, by James R. Grier et al., for System and Method for Proxying Data Access Commands in a Storage System Cluster.

Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

Maintenance Procedures ND (8C) nd-network disk control Feb. 1985.

Misc. Reference Manual pp. ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

Anthony J. McGregor Department of Computer Science, University of Waikato Dissertation: Block-Based Distributed File Systems Jul. 1997.

Chutani, Sailesh, et al., The Episode File System, In Proceedings of the USENIX Winter 1992, 18 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Hu Yoshida: "LUN Security Considerations for Storage Area Networks" Hitachi Data Systems, 1999, pp. 1-7, XP002185193.

Kazar, Michael L., et al., Decorum File System Architectural Overview, USENIX Summer Conference, Anaheim, California, 1990, 13 pages.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., the Sprite Network Operating System, Computer Science Division, Department of Electrical Engineering and Computer Sciences, Univ. of CA, Berkley, Nov. 19, 1987, 32 pages.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment Carnegie Mellon University, CMU-ITC.

Sidebotham, Bob, Volumes: The Andrew File System Data Structuring Primitive, EEUG Conference Proceedings, Manchester, UK, Autumn 1986.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23 1998, pp. 1-17, XP002194621.

* cited by examiner

SYSTEM AND METHOD FOR PROXYING DATA ACCESS COMMANDS IN A STORAGE SYSTEM CLUSTER

RELATED APPLICATIONS

This application is a divisional of U.S. patent application Ser. No. 11/118,299, filed by James R. Grier et al. on Apr. 29, 2005, now issued as U.S. Pat. No. 8,073,899 on Dec. 6, 2011.

FIELD OF THE INVENTION

The present invention relates to clustered storage systems and, in particular, to proxying data access commands in a clustered storage system.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising of a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as SCSI embedded in Fibre Channel (FCP). One example of a SAN arrangement, including a multi-protocol storage appliance suitable for use in the SAN, is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., now issued as U.S. Pat. No. 7,873,700 on Jan. 18, 2011.

It is advantageous for the services and data provided by a storage system, such as a storage appliance to be available for access to the greatest degree possible. Accordingly, some storage systems provide a plurality of storage appliances in a cluster, with a property that when a first storage appliance fails, the second storage appliance ("partner") is available to take over and provide the services and the data otherwise provided by the first storage appliance. When the first storage appliance fails, the second partner storage appliance in the cluster assumes the tasks of processing and handling any data access requests normally processed by the first storage appliance. One such example of a storage appliance cluster configuration is described in U.S. patent application Ser. No. 10/421,297, entitled SYSTEM AND METHOD FOR TRANSPORT-LEVEL FAILOVER OF FCP DEVICES IN A CLUSTER, by Arthur F. Lent, et al., now issued as U.S. Pat. No. 7,260,737 issued on Aug. 21, 2007. An administrator may desire to take a storage appliance offline for a variety of reasons including, for example, to upgrade hardware, etc. In such situations, it may be advantageous to perform a user-initiated takeover operation, as opposed to a failover operation. After the takeover operation is complete, the storage appliance's data will be serviced by its partner until a giveback operation is performed.

In certain known storage appliance cluster configurations, the transport medium used for communication between clients and the cluster is Fibre Channel (FC) cabling utilizing the FCP protocol (SCSI embedded in FC) for transporting data. In SCSI terminology, clients operating in a SAN environment are initiators that initiate requests and commands for data. The multi-protocol storage appliance is thus a target configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique, e.g. World Wide Node Name (WWNN) and World Wide Port Name (WWPN). A Device Identifier is unique within a given FC switching fabric and is assigned dynamically to an FC port by, e.g., a FC switch coupled thereto.

In conventional failover techniques involving clusters of storage appliances, each storage appliance in the cluster maintains two physical FC ports, namely an A port and a B port. The A port is utilized for processing and handling data access requests directed to the storage appliance. The B port typically is in a standby mode; when a failover situation occurs, the B port is activated and "assumes the identity" of its failed partner storage appliance. At that point, the B port functions as a FC target to receive and handle data access requests directed to the failed storage appliance. In this way, the surviving storage appliance may process requests directed to both the storage appliance and its failed partner storage appliance. Such a conventional FC failover is further described in the above-referenced patent application entitled SYSTEM AND METHOD FOR TRANSPORT-LEVEL FAILOVER OF FCP DEVICES IN A CLUSTER.

Typically, a port of a "surviving" storage appliance assumes the identity of its failed partner storage appliance by servicing data access requests direct to a WWNN and a WWPN of the partner. For many client operating systems, this is sufficient to permit clients to transparently access the surviving storage appliance as if it were the failed storage appliance. After the surviving storage appliance assumes the identity of the failed storage appliance, data access requests directed to the network address of the failed storage appliance are received and processed by the surviving storage appliance. Although it may appear to the clients as if the failed storage appliance was momentarily disconnected and reconnected to the network, data operations or data access requests continue to be processed.

However, other client operating systems, including, for example the well known HP/UX and AIX operating systems, utilize an FC device ID (DID) in addition to the WWPN and WWNN to identify a FC target. Clients utilizing such operating systems are thus unable to access a surviving storage appliance that assumes the identity of its failed partner, as described above. Additionally, these operating systems require that all network "paths" to the target, including the WWNN, WWPN and DID, are known during the original configuration of the client. This is typically accomplished by the client performing an input/output (I/O) scan of all connected device targets during system initialization. Accordingly, where clients utilize operating systems that require the use of a DID or that require prior knowledge of all available paths to a target, conventional failover techniques do not ensure continued connectivity.

Another noted problem with certain storage appliance cluster configurations occurs when a network path from a client to a storage appliance of a cluster fails. In such a situation, the storage appliance remains operational, but has lost network connectivity with the client. This may occur as a result of, for example, a failure of a switch in the network, improper cabling or failure of the physical transport medium. Often, the client may retain a network path to the other storage appliance in the cluster by, for example, a redundant data path via a second switch, etc. However, since both storage appliances are functioning correctly, the cluster will typically not perform a failover operation. Yet, clients are unable to access data stored within the storage appliance cluster because of the loss of connectivity.

In a SCSI proxying environment, such as that described in U.S. patent application Ser. No. 10/811,095, entitled SYSTEM AND METHOD FOR PROXYING DATA ACCESS COMMANDS IN A CLUSTERED STORAGE SYSTEM, by Herman Lee, et al, now issued as U.S. Pat. No. 7,340,639 on Mar. 4, 2008, a number of operations are sent over a cluster interconnect coupling the storage appliances of the cluster. The protocol utilized across the cluster interconnect is a block-based protocol similar to the SCSI protocol, which requires a number of messages to be transmitted across the cluster interconnect for any data access operation. For example, to perform a read operation three messages are required, namely, (i) a block-based read request sent by the storage appliance receiving the request ("the local storage appliance") to the partner storage appliance, (ii) a response issued by partner storage appliance, the response including the requested data and a status indicator, and (iii) a completion message issued by the local storage appliance in response to the partner's message, the completion message instructing the partner to "clean up" allocated buffers and to signify that the operation is complete.

To perform a write operation, additional messages are required, which results in five cross-interconnect messages. In the write situation, the local storage appliance sends the write request to the partner, which then responds with a request to transfer (R2T) message signifying that the partner is requesting to transmit the write data. In response to the R2T message, the local storage appliance sends the write data. The partner storage appliance then sends a status message once the data has been received and finally the local storage appliance sends a completion/cleanup message. As can be appreciated, there are a number of messages passed across the cluster interconnect in order to perform data access (read/write) operations in a SCSI proxying environment. Passing of such messages involves a substantial time delay (latency) in processing a data access operation.

SUMMARY OF THE INVENTION

The present invention overcomes the disadvantages of the prior art by providing a system and method for proxying data access commands using a file-level protocol between storage systems organized as a cluster. As used herein, a storage system cluster comprises a plurality of storage systems, embodied as storage appliances, interconnected by a cluster interconnect device. Each storage appliance is further coupled to a plurality of disks. According to the invention, one or more of the storage appliances in the cluster activates a selected port for use when proxying data access commands. This selected port (a "proxy port") may be either a physical Fibre Channel (FC) port or a virtual port associated with the physical port. The proxy port is configured by clients of the storage system cluster as an alternative network path to the disks of the cluster.

Upon receiving a command at its proxy port, a "local" storage appliance maps a block-based identification, such as a world wide port name (WWPN) and logical unit number (lun) identifier (ID), from the received command to a file handle. This file handle is then utilized to transmit a file-level protocol data access operation across the cluster interconnect to the "partner" storage appliance. By utilizing a file-level protocol, only two messages need to be passed over the cluster interconnect, which substantially reduces the bandwidth and latency required for proxying data access operations. For example when issuing a write operation, the local storage appliance transmits a file-level data access message (e.g., a write request) that includes the data to be written. In response the partner storage appliance transmits an acknowledgement message. When issuing a read operation, the local storage appliance transmits a file-level read request to the partner storage appliance, which responds with the requested data. In both cases, the partner storage appliance processes the file-level message and its enclosed operation by, inter alia, accessing the disks associated with the partner storage system. Any data associated with the processed operation is sent to the local storage appliance via the cluster interconnect and returned to the client. Thus, the local storage appliance serves as a "proxy" for the partner storage appliance and performs appropriate mappings to the partner storage system's file handles.

To accommodate the mapping functions on the local storage appliance, the storage appliances in the storage appliance cluster exchange relevant mapping information during system initialization. Should any mappings change during runtime the affected storage appliance broadcasts the changed information to its cluster partner.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Clustered Storage System Environment

Figure 1:
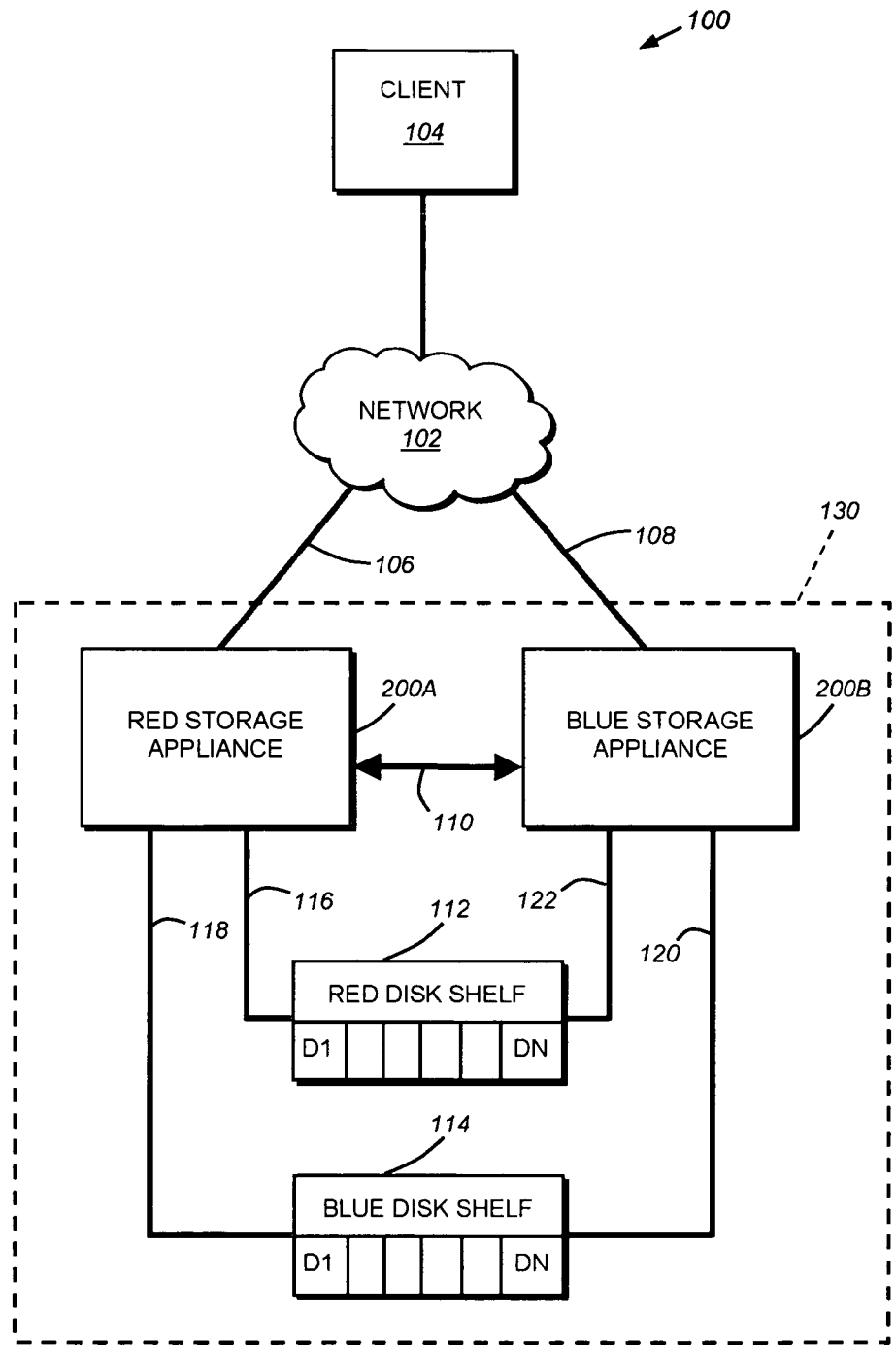
FIG. 1 is a schematic block diagram of a storage system cluster environment in accordance with an embodiment of the present invention.

FIG. 1 is a schematic block diagram of an exemplary network environment 100 in which the principles of the present invention are implemented. The environment 100 is comprises a network cloud 102 coupled to a client 104. The client 104 may be a general-purpose computer, such as a PC or a workstation, or a special-purpose computer, such as an application server, configured to execute applications over an operating system that includes block access protocols. A storage system cluster 130 comprising Red Storage System 200A and Blue Storage System 200B are also connected to the cloud 102. These storage systems, described further below, are illustratively embodied as storage appliances configured to control storage of and access to interconnected storage devices, such as disks residing on disk shelves 112 and 114.

In the illustrated example, Red Storage System 200A is connected to Red Disk Shelf 112 by a data access loop 116. It should be noted that such a data access loop can be any acceptable networking media including, for example, a Fibre Channel Arbitrated Loop (FC-AL). The Red Storage System 200A also accesses Blue Disk Shelf 114 via counterpart data access loop 118. Likewise, Blue Storage System 200B accesses Blue Disk Shelf 114 via data access loop 120 and Red Disk Shelf 112 through counterpart data access loop 122. Thus each disk shelf in the cluster is accessible to each storage appliance, thereby providing redundant data paths in the event of a failover. It should be noted that the Red and Blue disk shelves are shown directly connected to the storage systems 200 for illustrative purposes only. The disk shelves and storage systems may be operatively interconnected in any suitable FC switching network topology. Alternately, the disks may be connected to the storage systems using any computer-disk interconnection technique.

During normal cluster operation, the storage system that is connected to a disk shelf via the disk shelf's primary loop is the "owner" of the disk shelf and is primarily responsible for servicing data requests directed to blocks on volumes contained on that disk shelf. Thus, in this example, the Red storage system 200A owns the Red Disk Shelf 112 and is primarily responsible for servicing data access requests for blocks contained on that disk shelf. Similarly, the Blue storage system 200B is primarily responsible for the Blue disk shelf 114. When operating as storage system cluster 130, each storage system 200 is typically configured to take over and assume data handling capabilities for the other disk shelf in the cluster 130.

Connecting the Red and Blue Storage Systems 200A, B is a cluster interconnect 110, which provides a direct communication link between the two storage systems. The cluster interconnect 110 can be of any suitable communication medium, including, for example, an Ethernet connection or a FC data link.

Communication links 106 and 108 may comprise a plurality of differing connections including, for example, a single network link connection or multiple network "paths" between the network cloud 102 and the storage systems 200. For example, a single network link may be connected to a single physical port on a "local" storage system, which may further utilize a virtual port for servicing data access requests directed to itself and its "partner" storage system. Similarly, the storage system 200 may include a plurality of physical ports, each of which is connected to a separate physical network link 106 or 108. As would be appreciated by one skilled in the art, a plurality of configurations are possible to meet various configuration objectives of the storage system cluster 130.

B. Storage Appliance

Figure 2:
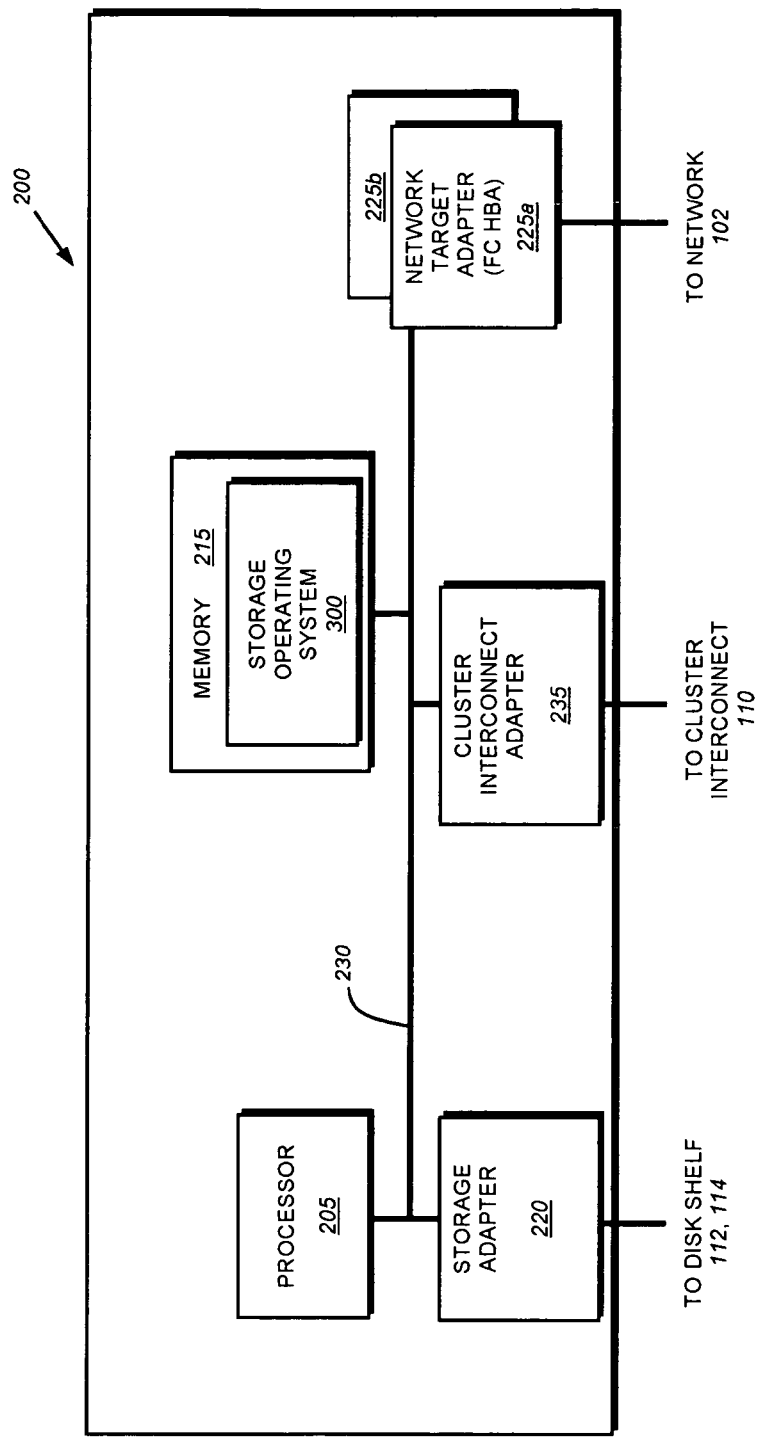
FIG. 2 is a schematic block diagram of an exemplary storage appliance in accordance with an embodiment of the present invention.

FIG. 2 is a schematic block diagram of an exemplary storage system 200 used in cluster 130 and configured to provide storage service relating to the organization of information on storage devices, such as disks. The storage system 200 is illustratively embodied as a storage appliance comprising a processor 205, a memory 215, a plurality of network adapters 225a, 225b, a storage adapter 220 and a cluster interconnect adapter 235 interconnected by a system bus 230. A storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. An example of such a storage appliance is further described in the above-referenced United States patent application entitled MULTI-PROTOCOL STORAGE APPLIANCE THAT PROVIDES INTEGRATED SUPPORT FOR FILE AND BLOCK ACCESS PROTOCOLS. Note that the terms "storage system" and "storage appliance" are used interchangeably. The storage appliance 200 also includes a storage operating system 300 that provides a virtualization system to logically organize the information as a hierarchical structure of directory, file and virtual disk (vdisk) storage objects on the disks.

The multi-protocol storage appliance 200 presents (exports) disks to SAN clients through the creation of luns or vdisk objects. A vdisk object (hereinafter "vdisk") is a special file type that is implemented by the virtualization function and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al., now issued as U.S. Pat. No. 7,107,385 on Sep. 12, 2006. The multi-protocol storage appliance thereafter makes these emulated disks accessible to the SAN clients through controlled exports, as described further herein.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and b couple the storage appliance to a plurality of clients over point-to-point links, wide area networks (WAN), virtual private networks (VPN) implemented over a public network (Internet) or a shared local area network (LAN) or any other acceptable networking architecture. The network adapters 225 a, b also couple the storage appliance 200 to a plurality of clients 104 that may be further configured to access the stored information as blocks or disks. The network adapters 225 may comprise a FC host bus adapter (HBA) having the mechanical, electrical and signaling circuitry needed to connect the storage appliance 200 to the network 102. In addition to providing FC access, the FC HBA may offload FC network processing operations from the storage appliance's processor 205. The FC HBAs 225 may include support for virtual ports associated with each physical FC port. Each virtual port may have its own unique network address comprising a WWPN and WWNN.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 200.

The appliance 200 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 200) by issuing iSCSI and/or FCP messages over the network cloud 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 300 implements a write-anywhere file system that cooperates with novel virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

A cluster interconnect adapter 235 of the storage appliance 200 is coupled to the cluster interconnect 110 to provide a connection to a cluster partner. Illustratively, the cluster interconnect adapter 235 is a FC HBA. However, in alternate embodiments, the cluster interconnect may be any suitable transport medium including, for example, Ethernet. Ethernet based cluster interconnects are further described in U.S. patent application Ser. No. 10\833,405, entitled SYSTEMS AND METHOD FOR PROVIDING REMOTE DIRECT MEMORY ACCESS OVER A TRANSPORT THAT DOES NOT NATIVELY SUPPORT REMOTE DIRECT MEMORY ACCESS OPERATION, by James R. Grier, et al. The storage appliance utilizes the cluster interconnect for a variety of purposes including, for example, exchanging status information and heartbeat signals with its cluster partner. In accordance with the illustrative embodiment of the present invention, the cluster interconnect also provides a data pathway for proxying data access commands.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT@, or as a general-purpose operating system with configurable functionality, which is configured for storage applications as described herein.

Figure 3:
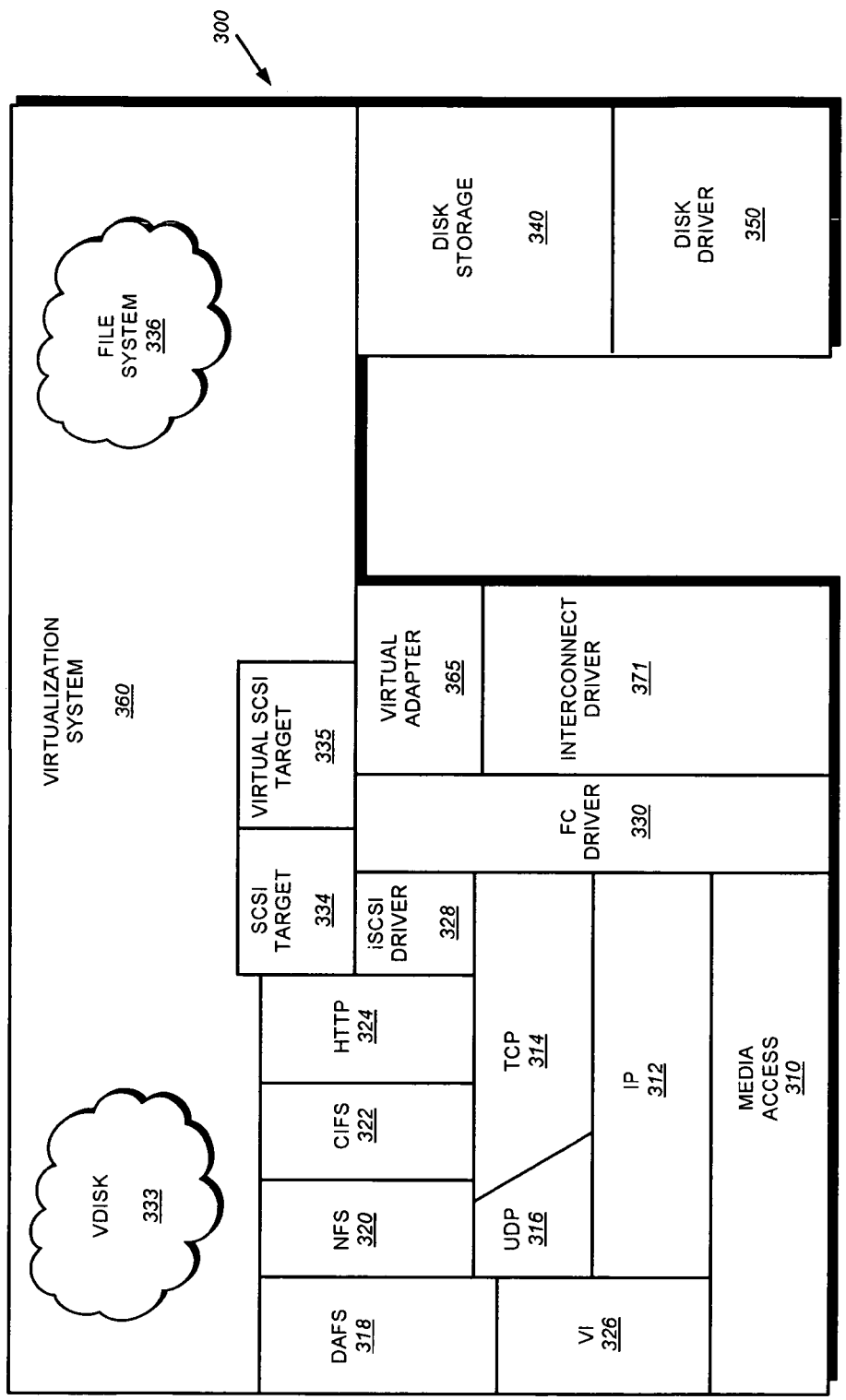
FIG. 3 is a schematic block diagram of an exemplary storage operating system for use with the exemplary storage appliance of FIG. 2 in accordance with an exemplary embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333, SCSI target module 334 and virtual SCSI target module 335. These modules may be implemented as software, hardware, firmware or a combination thereof. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks. By "disposing" SAN virtualization over the file system 336, the multi-protocol storage appliance reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

The storage operating system 300 also includes a virtual SCSI target module 335 that performs similar functions to the SCSI target module 334 but via a virtual adapter 365. In other words, the SCSI target module 334 acts as a SCSI target layer for requests coming from the physical HBA and FC driver, whereas the virtual SCSI target module 335 acts as a SCSI target layer for requests to and from the virtual adapter 365 and cluster interconnect 110. The virtual SCSI Target module 335 illustratively implements the present invention by, inter alia, processing a received SCSI command (via iSCSI or FCP) to generate a file-level protocol request to be transmitted to the partner storage system via the virtual adapter 365. It should be noted that in alternative embodiments these functions may be implemented in other modules of the storage operating system. The virtual SCSI target module 335 is disposed over an interconnect communication stack that comprises the virtual adapter 365 and an interconnect driver layer 371. The virtual adapter 365 provides a software interface between the virtual SCSI target module 335 and the interconnect protocol stack, i.e., the virtual adapter 365 functions as an adapter driver to the interconnect protocol stack.

In accordance with the illustrative embodiment, the FC driver 330 directs received FCP commands to either the SCSI target module 334 or the virtual SCSI target module 335 depending upon the port at which the command is received. If the command is received at a port utilized by the storage appliance for accepting data requests directed to vdisks or files serviced by that storage appliance ("a local port"), the FC driver forwards the command to the SCSI target module. If the command is received at a port utilized by the storage appliance for receiving requests to be proxied to a partner storage appliance ("a proxy port"), the FC driver 330 passes the command to the virtual SCSI target module 335 for processing. Thus, the FC driver 330 makes this forwarding decision based upon the port from which the command is received. It should be noted that in alternate embodiments, the forwarding decision may be based upon other factors, including, for example, a lun value within the received command or the network address of the initiator.

D. Data Access Proxying

As noted, each device attached to a FC network has a unique World Wide Node Name (WWNN) that illustratively is a 64-bit value. Each FC device also has one or more associated ports, each of which has a unique World Wide Port Name (WWPN) that is illustratively a 64-bit value. Each device is, thus, uniquely identified by a WWNN and one or more WWPNs.

In the illustrative embodiment, each storage appliance in the storage system cluster 130 includes a plurality of data access ports, e.g., two FC ports, on FC HBA 225. Each HBA may alternatively have a single FC port or multiple virtual ports on a single physical port. It should be noted that while this description is written in reference to FC and HBAs, the teachings of the present invention are applicable to any suitable networking medium including, for example, TCP/IP over Ethernet (iSCSI). A first port (a "local port"), whether physical or virtual, is utilized by the storage appliance for accepting data access requests directed to vdisks or files serviced by the storage appliance. A second port (a "standby port") may be utilized during takeover in the event of a failure of a partner storage appliance. Such a failover procedure utilizing virtual ports is described in U.S. patent application Ser. No. 10/672,260, entitled SYSTEM AND METHOD FOR FAILOVER USING VIRTUAL PORTS IN CLUSTERED SYSTEMS, by Fang Wang, et al., now issued as U.S. Pat. No. 7,467,191 on Dec. 16, 2008.

A third port (a "partner port" or "proxy port") may be utilized for proxying data access to the partner storage appliance in accordance with the teachings of the present invention. It should be noted that any number of ports may be utilized. For example, a storage appliance may have only a local port for accepting data access requests directed to it and a proxy port for proxying data access commands; here, the storage appliance does not have a standby port for a failover situation. As will be appreciated by those skilled in the art, multiple configurations are possible including, for example, the use of virtual and physical ports in mixed configurations. For example, the local port may be a physical port while the standby and proxy ports may utilize virtual ports associated with the same physical port.

The present invention permits clients of the storage appliance cluster to utilize redundant data paths to disks connected to a storage appliance in the cluster. The first data path to disks is via a direct connection to the storage appliance (the local storage appliance) and the second path is via a proxy port on the local storage appliance. If connectivity is lost to the partner storage appliance, a client may continue to access data serviced by the partner storage appliance by directing data access requests to the proxy port of the local storage appliance in the cluster. In the illustrative embodiments the local storage appliance maps a received block-based data access command to a file-level command to be processed by the partner storage appliance. In a block-based cluster, such as one utilizing the FCP protocol, the local storage appliance performs lun mapping/masking operations normally performed by the partner storage appliance.

Figure 4:
FIG. 4 is a schematic block diagram of an exemplary initiator data structure in accordance with an embodiment of the present invention.

Data structures used by the SCSI target module 334 and virtual SCSI target module 335 structures illustratively include a set of initiator data structures 400 as shown in FIG. 4. The initiator data structure 400 is, illustratively, created when a new initiator first connects to the storage appliance. Thus, each initiator data structure is associated with a SCSI initiator (i.e., a client of the storage appliance). The storage appliance illustratively populates the various fields with data obtained during the connection stage. The initiator data structure 400 includes various fields including, a next initiator field 405, previous initiator field 410, a port name field 415, a node name field 420, a number of lun maps field 425, a lun maps field 500, and, in alternate embodiments, additional fields 435. The next and previous initiator fields 405, 410 are utilized to generate a linked list of initiator data structures 400 of all initiators associated with a storage appliance. The port name field 415 identifies the world wide port name (WWPN) associated with the initiator, whereas the node name field 420 contains the world wide node name (WWNN) associated with the initiator. The WWNN and WWPN comprise a unique address of the initiator. The number of lun maps field 425 identifies the number lun maps associated with a given initiator. The lun maps field 500 contains pointers to lun maps associated with a particular initiator. Typically, the storage appliance keeps a linked list of initiators associated therewith for use in performing lun mapping operations. However, in accordance with the present invention, each storage appliance of a storage appliance cluster maintains initiator information associated with all initiators connected to any storage appliance in the cluster. This information includes the appropriate lun maps, which permit a local node to perform the appropriate lun mapping operations to generate a file-level protocol request to transmit to a partner storage appliance in accordance with an embodiment of the pre-sent invention.

Figure 5:
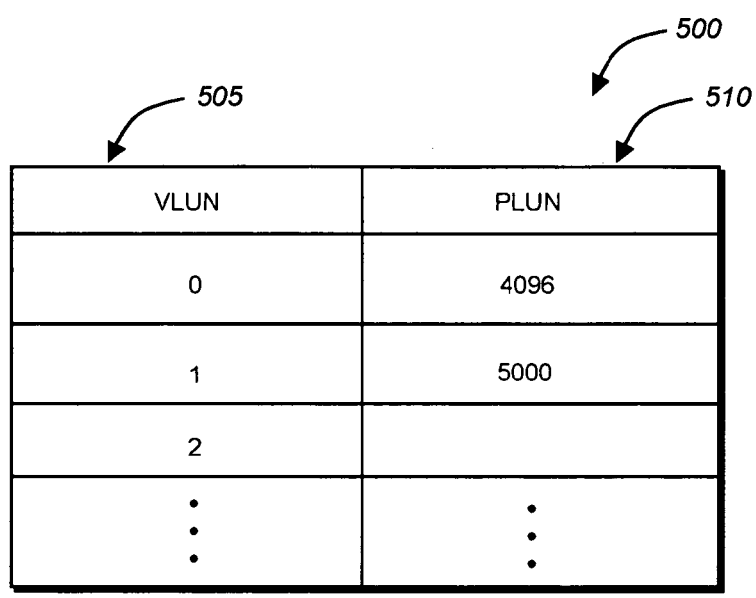
FIG. 5 is a schematic block diagram of an exemplary LUN map in accordance with an embodiment of the present invention.

An exemplary lun map 500, shown in FIG. 5, maps virtual luns (VLUN) to physical luns (PLUNs). A VLUN is a lun returned to a given SCSI initiator in a storage system environment. An initiator may be assigned a set of VLUNs starting from zero and progressing up to the number of luns to which the initiator is connected. Conversely, a PLUN is an actual lun associated with a vdisk managed by the storage appliance. As the storage appliance is an intermediary between clients and vdisks, it typically manages a larger set of luns than are visible to a given client. The lun map 500 has, in the exemplary embodiment, two columns. The first column, VLUN 505, identifies the virtual logical unit number that a given SCSI initiator is accessing. In one embodiment of the present invention, each SCSI initiator attached to the storage appliance has its own lun address space. The second column is comprises of PLUNs 510 that map to corresponding VLUNs 505. Thus, in the example shown in FIG. 5, VLUN 0 is maps to PLUN 4096. Similarly VLUN 1 maps to PLUN 5000. The use of VLUN to PLUN mapping enables each SCSI initiator to address a given device with an initiator-specific lun value, i.e. a VLUN. If a given lun value is not exported to a given client, the PLUN value associated with the VLUN entry in the lun map 500 is empty. For example, in the exemplary lun map 500 shown in FIG. 5, VLUN 2 does not map to any PLUN value. Thus, any data access request directed to VLUN 2 by this client will result in an error. The storage appliance utilizes the LUN map 500 to translate a given VLUN from a SCSI initiator to the appropriate PLUN attached to the storage appliance.

Figure 6:
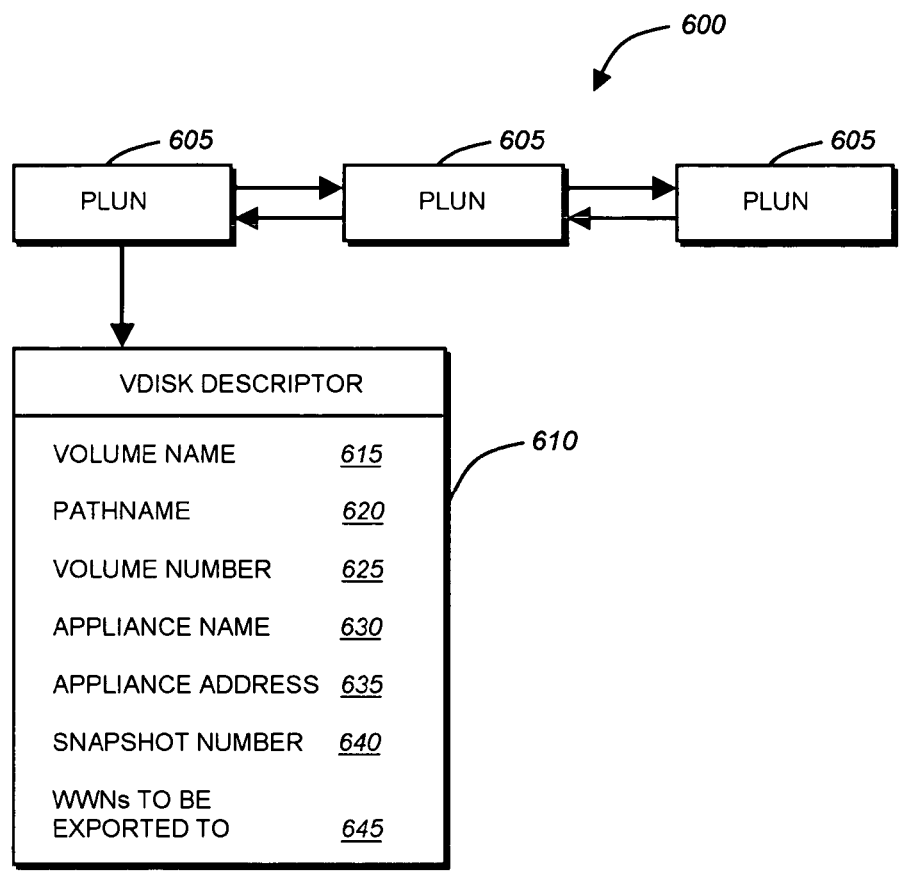
FIG. 6 is a schematic block diagram of exemplary linked LUN data structures in accordance with an embodiment of the present invention.

FIG. 6 shows an exemplary set 600 of linked lun data descriptor structures ("objects") 605 maintained by the SCSI target and virtual SCSI target modules. Each lun data descriptor object 605 contains various data associated with a given vdisk embodied as that PLUN. This information is used by the storage appliance for management of the given vdisk. Each lun data descriptor object 605 also, illustratively, includes a vdisk descriptor 610.

Each vdisk (lun) managed by the storage appliance has an associated vdisk descriptor 610 that includes various data fields for information pertaining to the vdisk. These fields include volume name 615, path name 620, volume number 625, appliance name 630, appliance address 635, snapshot number 640 and a list of WWNs 645 that the lun is to be exported to. It should be noted that the fields described herein are exemplary only in that additional and/or differing fields may be utilized in accordance with various embodiments of the invention. For example, the volume name field 615 identifies the volume containing the vdisk. The path name field 620 describes a path on the volume identified in the volume name field 615 to the file containing the vdisk. Thus if the appliance name stored in field 630 is "Appliance5", the volume name stored in field 615 is "vol0" and the path name stored in field 620 is "/vdisks/vdisk," then the vdisk identified by this vdisk descriptor 610 may be uniquely identified by the fully qualified path "Appliance5:/vol0/vdisks/vdisk." The list of WWNs 645 stores the WWNs of clients that the lun is to be exported to and that may access the given lun. The list of WWNs 645 may be set by an administrator when the vdisk is initially created.

The present invention provides a system and method for proxying data access commands between storage systems organized in a cluster. As noted above, a storage system cluster comprises a plurality of storage systems, embodied as storage appliances, that are interconnected by cluster interconnect devices. According to the present invention, one or more of the storage appliances in the cluster activates a selected port for use in proxying data access commands. This selected proxy port may be either a physical fiber channel port or a virtual port associated with a physical port. Clients of the storage system cluster are configured to use the proxy port as an alternative network path to the disks of the cluster.

Upon receiving a command at its proxy port, a local storage appliance maps the WWNN/WWPN and lun ID from the received command to a file handle associated with a file on its partner storage appliance. This file handle is then utilized to transmit a file-level protocol data access operation over the cluster interconnect to the partner storage appliance. By utilizing a file-level protocol, only two messages are required to be passed over the cluster interconnect, thereby substantially reducing the bandwidth and latency typically required for proxying data access operations. The partner storage appliance processes the file-level command by, inter alia, accessing the disks associated with the partner storage system. Any data associated with the processed command is sent to the local storage appliance via the cluster interconnect and the file-level protocol and is thereafter returned to the client after being converted to the appropriate block-level protocol utilized by the client.

Figure 7:
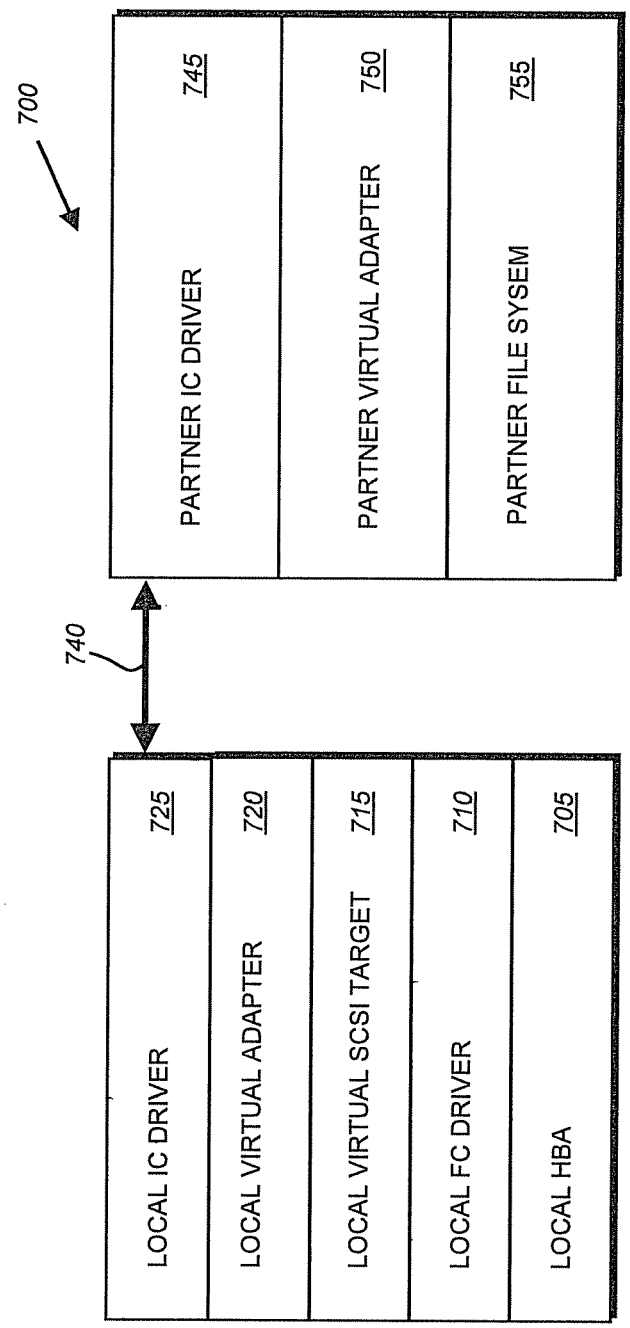
FIG. 7 is a schematic block diagram of software and hardware layers in accordance with an embodiment of the present invention.

FIG. 7 is a schematic block diagram illustrating various software and hardware layers that a proxy data access request passes through in accordance with an embodiment of the present invention. A client sends a proxy request to the local storage appliance, where it is received at an appropriate proxy port of the local HBA 705. As noted above, the proxy port may be either a virtual or physical port associated with the HBA. In alternate embodiments, other network interfaces may be utilized in accordance with the teachings of the present invention. The proxy request is then processed by the local FC driver 710. Specifically, the local FC driver 710 strips FC header or footer information from the received proxy request and passes a "payload" SCSI command to the local virtual SCSI target module 715. In the illustrative embodiment, a forwarding decision is made as to whether the payload command is forwarded to the virtual SCSI target module 715 or to the non-virtual SCSI target module (334 of FIG. 3); the decision is illustratively based on the port at which the command is received. For example, commands received at the proxy port are passed to the virtual SCSI target module and those commands received at the local port are passed to the local SCSI target module. It should be noted that in alternate embodiments, this forwarding decision may be based on other criteria, including, for example, an address of the initiator originating the SCSI command.

The local virtual SCSI target module 715 processes the received block-level request and transforms it into a file-level protocol request to be transmitted over the cluster interconnect. The local virtual SCSI target module 715 also performs the appropriate mapping from the received lun ID to generate a file handle associated with the file embodying the vdisk on the partner storage appliance. The local virtual SCSI target module 715 then transmits the file-level protocol request to the local virtual adapter 720, which interfaces with the local interconnect (IC) driver 725 to transmit the file-level protocol request over the cluster interconnect 740. The local virtual adapter 720 acts as an adapter for a "virtual" SCSI device, and, as such, interfaces with the local interconnect driver 725 to send an appropriate RDMA write/read operation over the physical cluster interconnect 740.

The data request is thereafter received by the partner interconnect driver 745 and passed to a partner virtual adapter 750. The partner virtual adapter 750, in turn, passes the received command to the partner file system 755. The partner file system services the requested file-level command. The responsive data (if any) is then passed from the partner file system 755 through partner virtual adapter 750 to the partner IC driver 745. The partner interconnect driver 745 then transmits the response over the physical interconnect 740 to the local interconnect driver 725. Upon receiving the response data, the local interconnect driver 725, passes it through the various software layers to the local virtual SCSI target module 715, which generates an appropriate SCSI response and data structure. The generated SCSI response is then passed to the local FC driver 710 to be sent out via the local HBA 705 to the requesting client.

Figure 8:
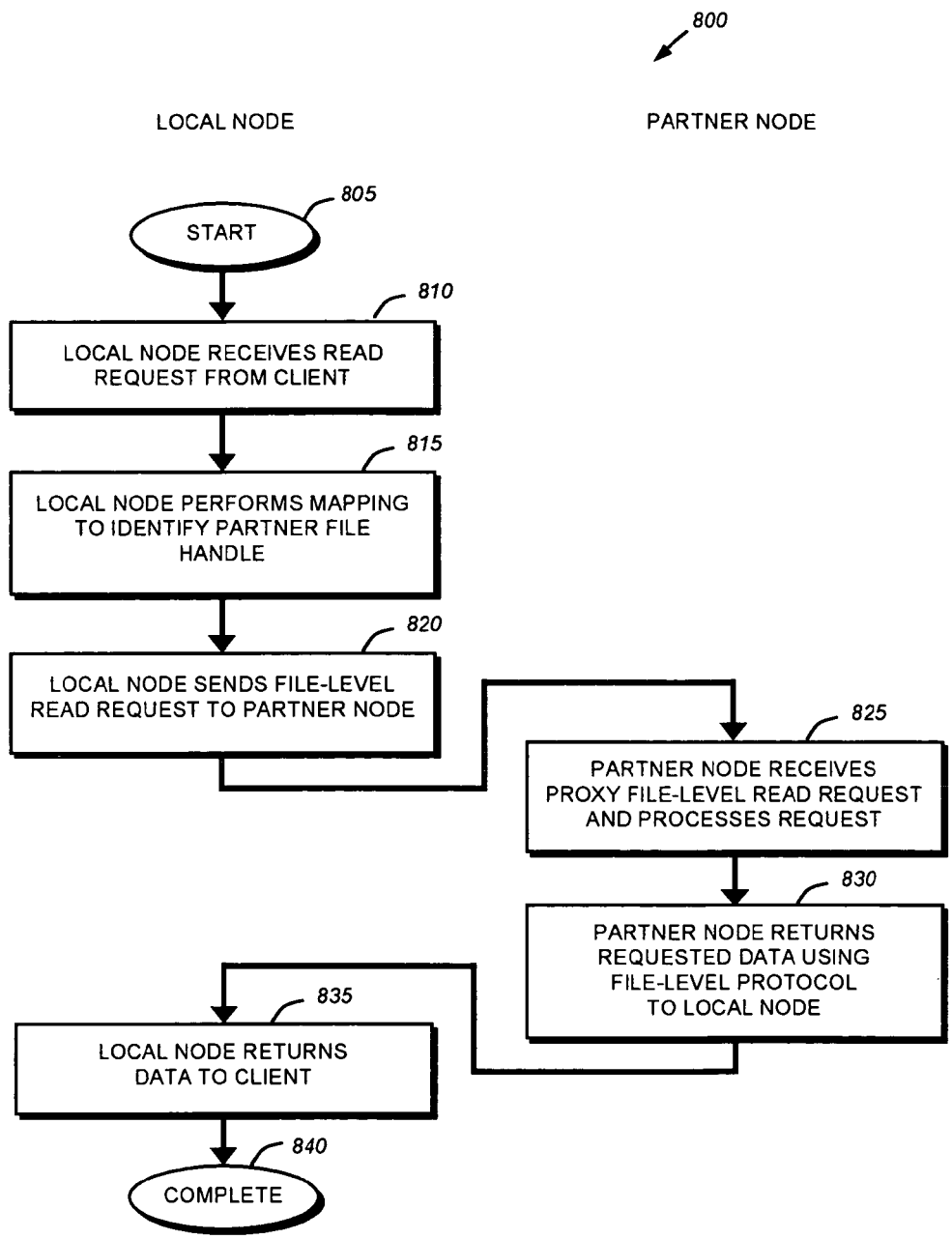
FIG. 8 is a flowchart detailing the steps of a procedure for processing a real request in accordance with an embodiment of the present application.

FIG. 8 is a flowchart detailing the steps of a procedure 800 for processing a read request in accordance with an embodiment of the present invention. The procedure begins in step 805 and continues to step 810 where the local storage system (local node) receives a read request from a client via its designated proxy port. In step 815, the local node performs the appropriate mapping to identify the partner file handle associated with the target data container stored on the partner storage system (partner node). This mapping includes identifying the appropriate lun mapping from the initiator data structure associated with the client and performing the appropriate lun mapping from the VLUN to PLUN. Once the appropriate PLUN has been identified, the local then identifies the appropriate lun data structure and generates the fully qualified name from the data contained therein to generate an appropriate file-level file handle. The local node then sends a file-level read request to the partner node identifying the file to be read using the mapped file handle (step 820). The partner node receives the file-level read request and processes the request by, for example, retrieving the appropriate data from disk (step 825). In step 830, the partner node sends the data to the local node using the file-level protocol. The local node receives the data and, in step 835, returns the requested data to the client by mapping the data into the appropriate block-level protocol that was utilized by the client when transmitting the read request. This may be accomplished by, for example, creating an appropriate SCSI, FCP or iSCSI response from the data and forwarding it to the client. The procedure then ends in step 840.

Figure 9:
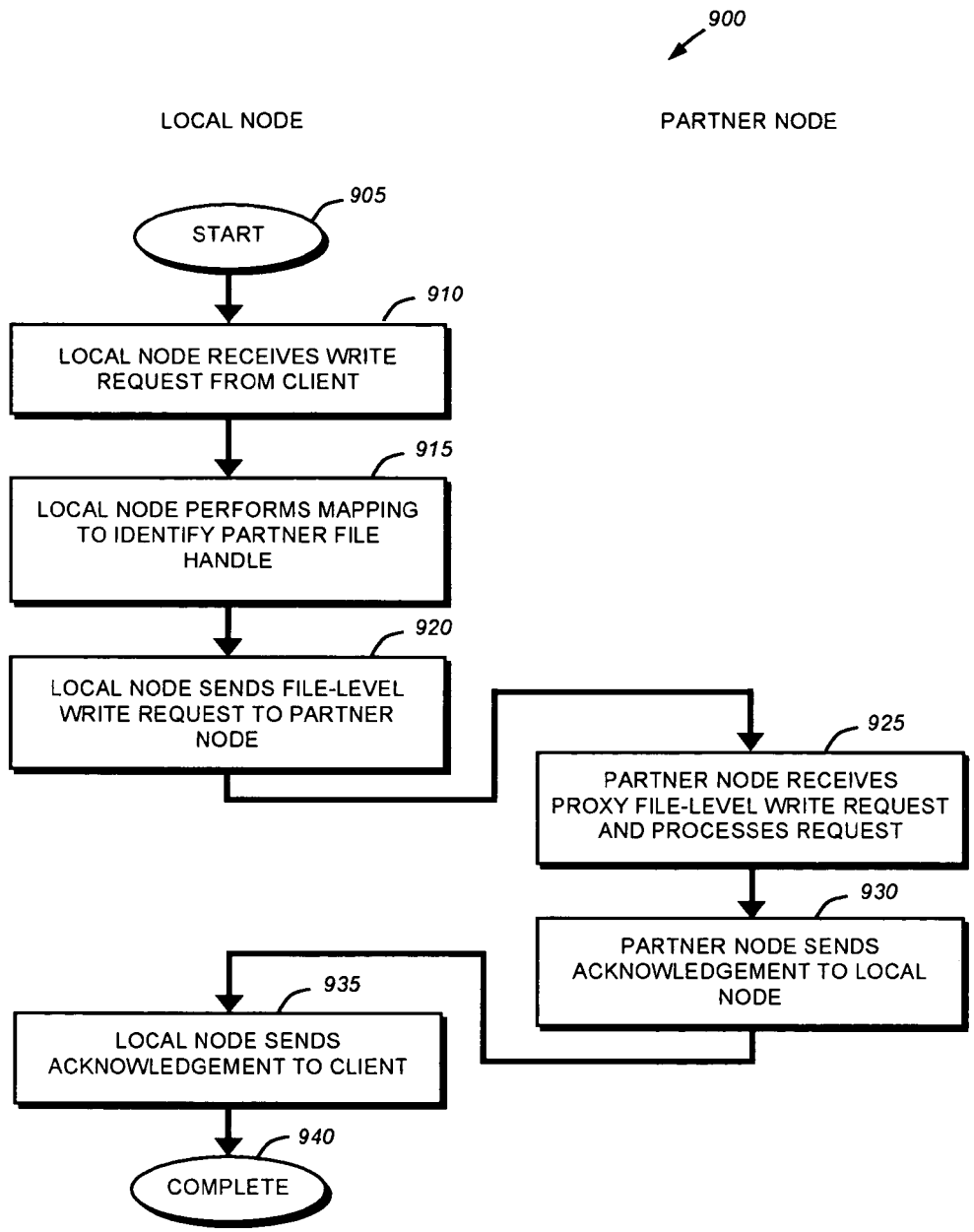
FIG. 9 is a flowchart detailing the steps of a procedure for processing a write request in accordance with an embodiment of the present invention.

FIG. 9 is a flow chart detailing the steps of a procedure 900 for processing write requests in accordance with an embodiment of the present invention. The procedure begins in step 905 and continues to step 910 where the local node receives the write request from the client. The local node performs the appropriate mapping to identify the partner file handle associated with the data access request and then, in step 920 sends a file-level write request to the partner node. The partner node receives the file-level request and, in step 925, processes the request by writing the data to the appropriate locations within the file. Once the data has been written, the partner node sends an acknowledgment to the local node in step 930. Upon receipt by the local node of the acknowledgement, the local node transmits an acknowledgement of completion of the write operation to the client in step 935. The procedure then completes (step 940).

E. File-Level Protocol For Use Over Cluster Interconnect

In accordance with an embodiment of the present invention, the storage systems communicate using a file-level protocol over the cluster interconnect. Illustratively, the local node receives a SCSI operation from an initiator and converts the operation into an appropriate read/write file-level operation data structure that is sent over the cluster interconnect.

Figure 10:
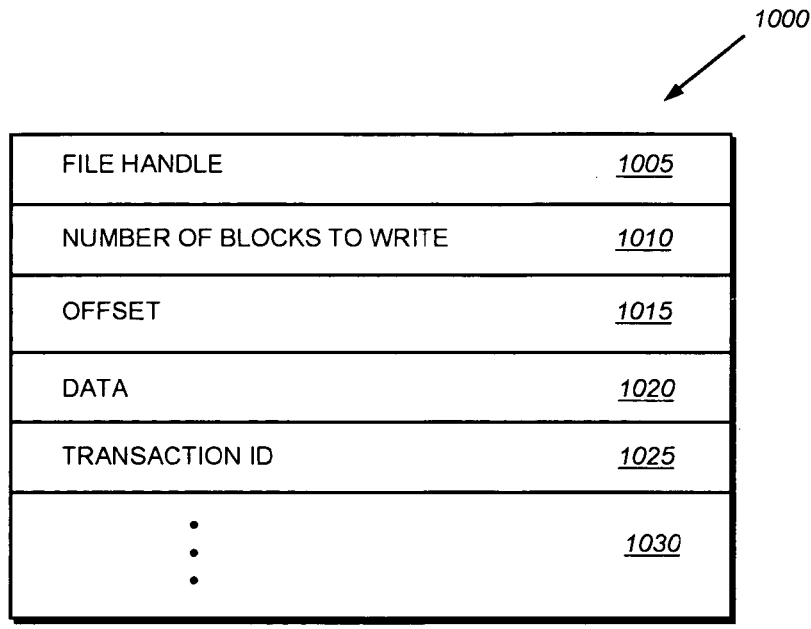
FIG. 10 is a schematic block diagram of an exemplary file-level write operation data structure in accordance with an embodiment of the present invention.

FIG. 10 is a schematic block diagram of an exemplary file-level protocol write operation data structure 1000 utilized in accordance with an embodiment of the present invention. The file-level write operation data structure 1000 illustratively comprises a file handle field 1005, a number of blocks to write field 1010, an offset field 1015, a data field 1020, a transaction identifier (ID) field 1025 and, in alternate embodiments, additional fields 1035. The file handle field 1005 contains a conventional storage operating system file handle identifying the file embodying the lun to which the operation is directed that is stored on the partner storage system. The number of blocks to write field 1010 identifies the number of data blocks to be written by the operation. The offset field 1015 identifies an offset into the file where the write operation is to begin. The data field 1020, contains the actual data to be written. The transaction ID field 1025 contains a unique transaction ID that is utilized for matching a response with the write operation.

Figure 11:
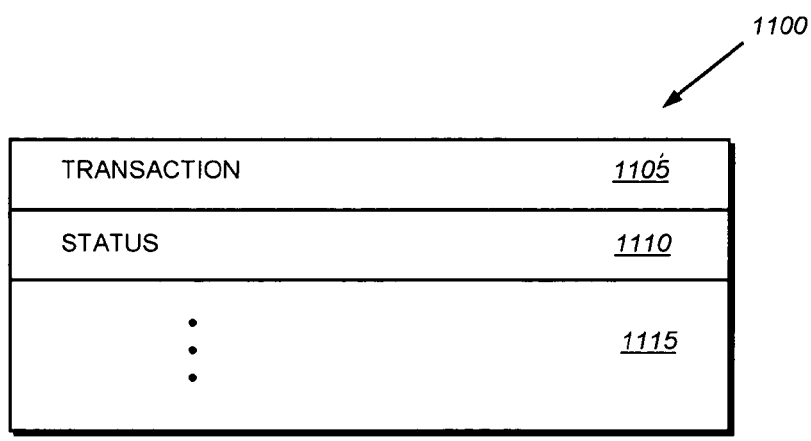
FIG. 11 is a schematic block diagram of an exemplary file-level write operation response data structure in accordance with an embodiment of the present invention.

A write response data structure 1100 is shown in FIG. 11. The write response data structure 1100 comprises a transaction identifier (ID) field 1105, a status field 1110 and, in alternate embodiments, additional fields 1115. The transaction ID field 1105 contains the unique transaction identifier of the write operation to which this response is associated. The status field 1110 contains a status indicator of whether the write operation completed or if an error condition occurred.

Figure 12:
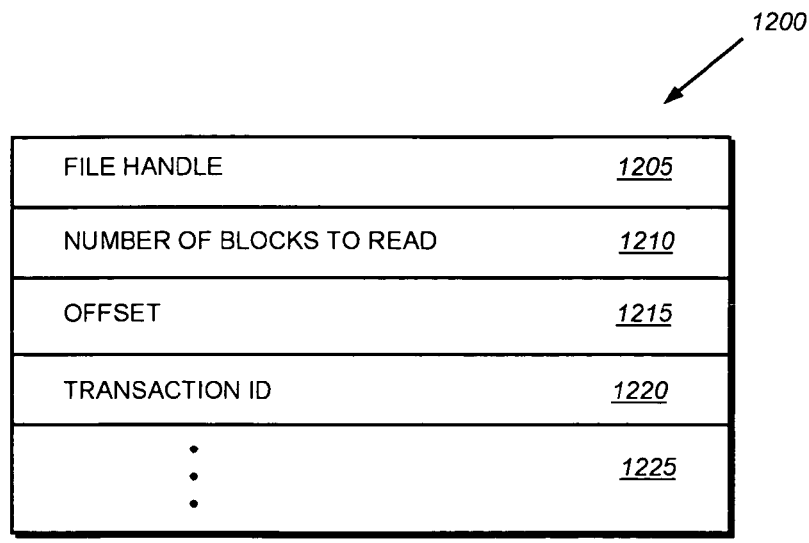
FIG. 12 is a schematic block diagram of an exemplary file-level read operation data structure in accordance with an embodiment of the present invention.

FIG. 12 is a schematic block diagram of an exemplary file-level read operation data structure 1200 in accordance with an embodiment of the present invention. The file-level read operation data structure 1200 comprises a file handle field 1205, a number of blocks to read field 1210, an offset field 1215, a transaction identifier (ID) field 1220 and, in alternate embodiments, additional fields 1225. The file handle field 1205 contains a conventional storage operating system file handle identifying the partner's file embodying the desired lun. The number of blocks to read field 1210 identifies a number of data blocks to be read. The offset field 1215 contains an offset into the file at which the read operation should begin. The transaction ID field 1220 contains a unique transaction ID for use in matching a read response with the read request.

Figure 13:
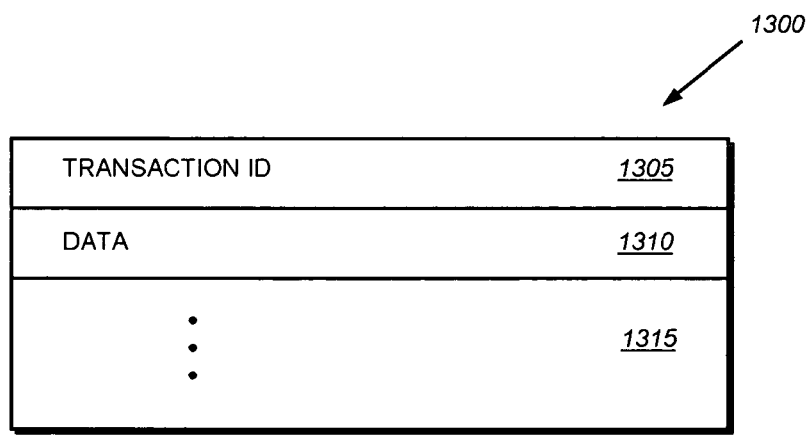
FIG. 13 is a schematic block diagram of an exemplary file-level read response data structure in accordance with an embodiment of the present invention.

FIG. 13 is a schematic block diagram of an exemplary read response data structure 1300 in accordance with an embodiment of the present invention. The read request data structure 1300 comprises a transaction identifier field 1305, a data field 1310 and, in alternate embodiments, additional fields 1315. The transaction identifier field 1305 contains a unique transaction identifier is associated with the read request to which this is responsive. The data field 1310 contains the requested data.

F. Coordination of Mapping Information

In accordance with an embodiment of the present invention, the storage systems in a storage system cluster update their lun mappings and associated information with their partner so that the appropriate mapping processes may occur before an operation is converted to the file-level protocol for transmission over the cluster interconnect. It should be noted that the exemplary mapping operations described below should be taken as illustrative only and that alternate data structures may be utilized to achieve the teachings of the present invention.

Figure 14:
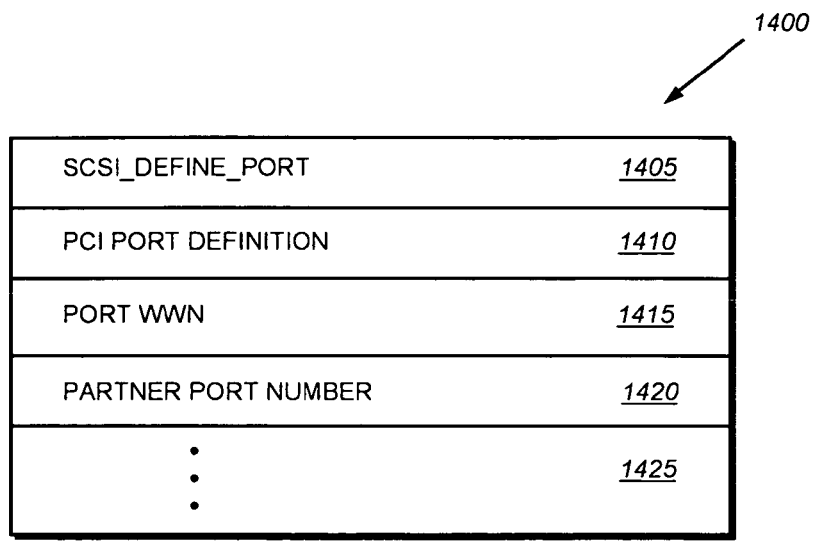
FIG. 14 is a schematic block diagram of an exemplary define port operation data structure in accordance with an embodiment of the present invention.

FIG. 14 is a schematic block diagram of an exemplary define port data structure of 1400 in accordance with an embodiment of the present invention. The define port data structure comprises a SCSI-Define_Port header 1405, a PCPI definition field 1410, a port world wide name (www) field 1415, a partner port number field 1420, and in alternate embodiments additional fields 1425. The SCSI_Define_Port header field 1405 defines this data structure as a defined port operation. The PCI port definition field 14101 identifies the port location associated with the operation. Similarly, the port WWN field 1415 contains the WWN that identifies the port. The partner port number field 1420 contains a partner port number that is utilized for future of operations directed to this port.

Figure 15:
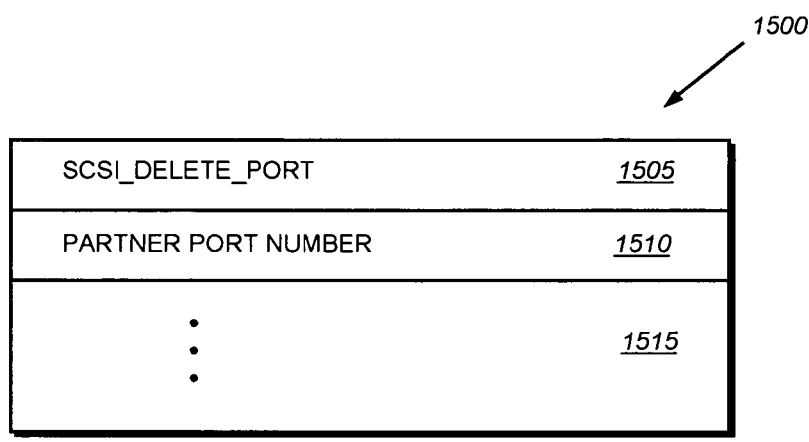
FIG. 15 is a schematic block diagram of an exemplary delete port operation data structure in accordance with an embodiment of the present invention.

FIG. 15 is a schematic block diagram of an exemplary delete port operation in accordance with an embodiment of the present invention. The delete port operation data structure 1500 comprises a SCSI_Delete_Port header 1505, a partner port number field 1510, and in alternate embodiments additional fields 1515. The SCSI_Delete_Port header 1505 identifies the operation as a delete port operation. The partner port number field 1510 contains a partner port number identifying the port to be deleted.

Figure 16:
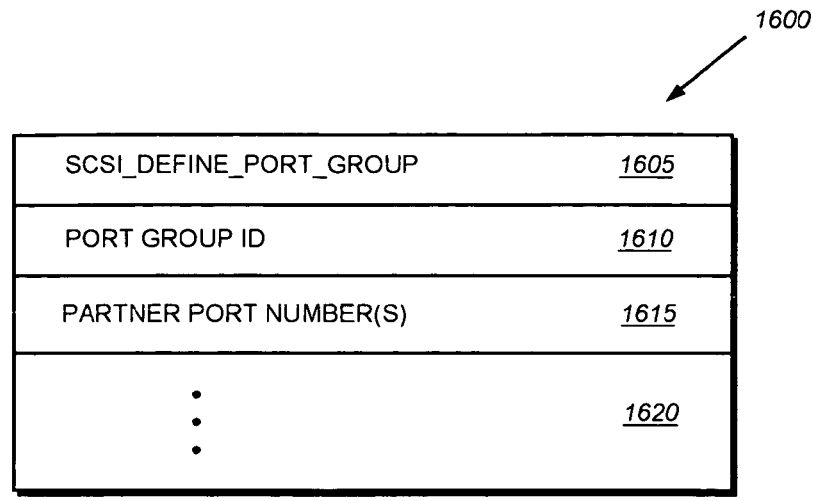
FIG. 16 is a schematic block diagram of an exemplary defined port group operation data structure in accordance with an embodiment of the present invention.

FIG. 16 is a schematic block diagram of an exemplary define port group operation data structure 1600 in accordance with an embodiment of the present invention. The define port group data structure 1600 comprises a SCSI_Define_Port_Group header 1605, a port group identifier field 1610, one or more partner port number fields 1615 and, in alternate embodiments, additional fields 1620. The SCSI_Define_Port_Group header 1605 identifies this operation as a to find port group operation. The port group identifier field 1610 contains a port group identifier to be utilized in future operations. The list of partner port numbers 1615 comprising the port numbers to be associated with the port group identifier contained in the port group identifier field 1610.

Figure 17:
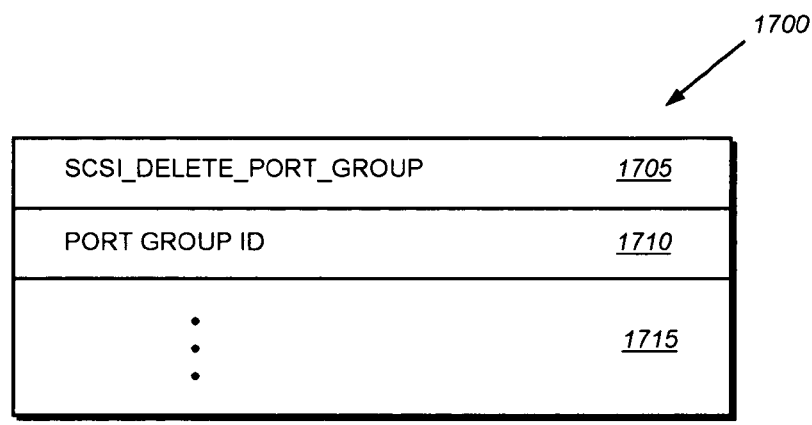
FIG. 17 is a schematic block diagram of an exemplary delete port group operation data structure in accordance with an embodiment of the present invention.

FIG. 17 is a schematic block diagram of an exemplary delete the group operation data structure 1700 in accordance with embodiment of the present invention. The delete port group operation data structure 1700 comprises a SCSI_Delete_Port_Group header 1705, a port group identifier field 1710 and, in alternate embodiments additional fields 1715. The SCSI_Delete_Port_Group header 1705 identifies the operation as a delete group operation. The port group identifier field 1710 contains a port group identifier that is to be deleted by this operation.

Figure 18:
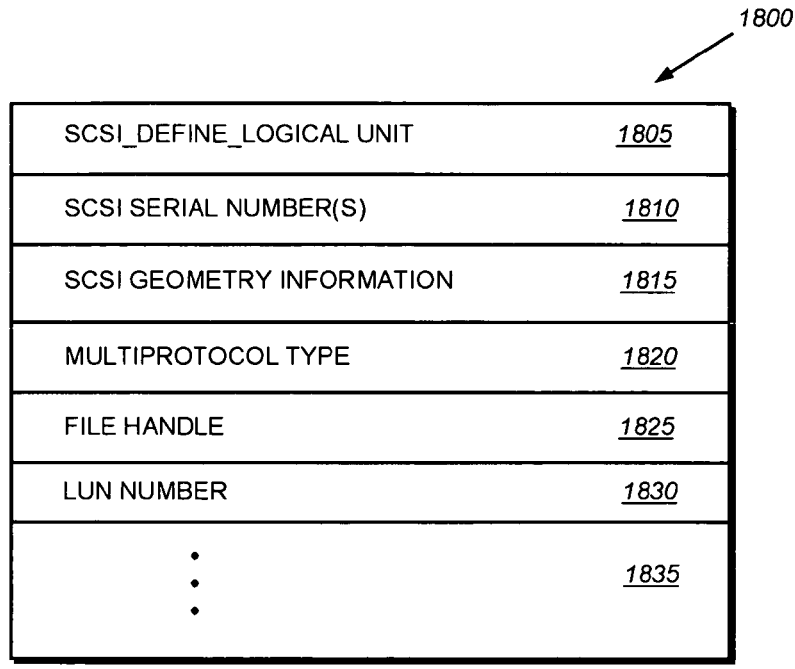
FIG. 18 is a schematic block diagram of an exemplary to find logical unit operation data structure in accordance with an embodiment of the present invention.

FIG. 18 is a schematic block diagram of a exemplary define logical unit operation data structure 1800 accordance with an embodiment of the present invention. The define logical unit data structure 1800 comprises a SCSI_Define_Logical_Unit header 1805, one or more SCSI serial number fields 1810, a SCSI geometry information field 1815, a protocol type field 1820, a file handle field 1825, a lun number field 1830 and, in alternate embodiments, additional fields 1835. The SCSI-Define_Logical_Unit header 1805 identifies the operation as a define logical unit operation. The SCSI serial number fields 1810 contain the appropriate SCSI serial numbers associated with the logical unit. The SCSI geometry information field 1815 contains the appropriate geometry information, such as sector size, cylinder size, etc. associated with the logical unit. The multiprotocol type field 1820 identifies which of a plurality of possible protocols, such as Windows, is to be utilized. The file handle field 1825 contains a file system file handle associated with the file embodying the logical unit. The lun number field 1830 contains the lun number associated with this logical unit.

Figure 19:
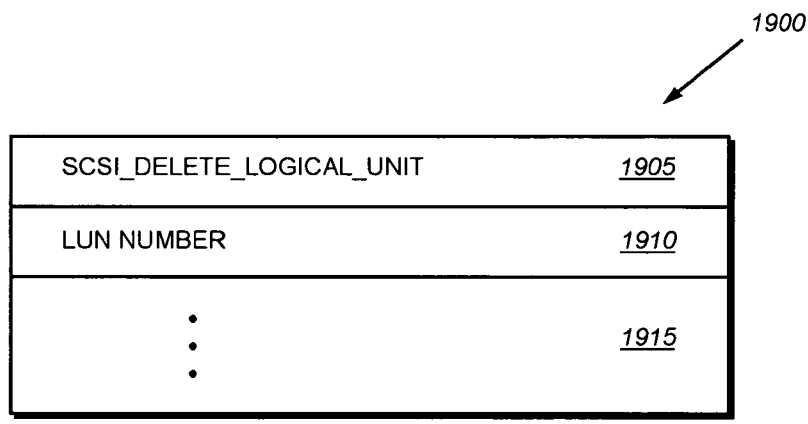
FIG. 19 is a schematic block diagram of an exemplary delete logical unit data operation data structure in accordance with an embodiment of the present invention.

FIG. 19 is a schematic block diagram of an exemplary delete logical unit operation data structure 1900 in accordance with embodiment of the present invention. The delete logical unit data structure 1900 comprises a SCSI-Delete_Logical_Unit header 1905, a lun number field 1910, and, in alternate embodiments, additional fields 1915. The SCSI_Delete_Logical_Unit header 1905 identifies this operation as a delete logical unit operation. The lun number field 1910 contains the lun number to be deleted.

Figure 20:
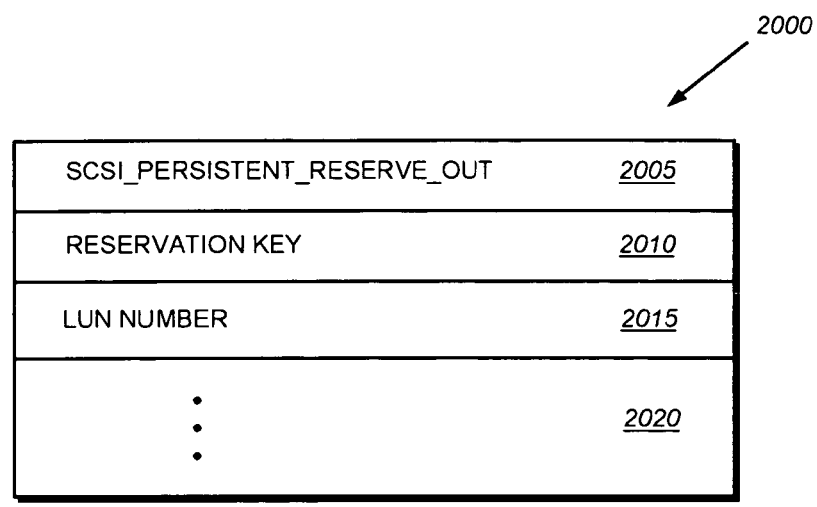
FIG. 20 is a schematic block diagram of an exemplary persistent reservation operation data structure in accordance with an embodiment of the present invention.

FIG. 20 is a schematic block diagram of an exemplary persistent reservation operation data structure 2000 in accordance with an embodiment of the present invention. The persistent reservation data structure of 2000 comprises a SCSI_Persistent_Reserve_Out header 2005, a reservation key field 2010, a lun number field 2015, and, in alternate embodiments, additional fields 2020. The SCSI_Persistent_Reserve_Out header 2005 identifies this data structure 2000 as a persistent reservation operation. The reservation key field 2010 contains the reservation that an initiator has placed on a particular lun. The lun number field 2015 identifies the lun on which the reservation has been placed.

Figure 21:
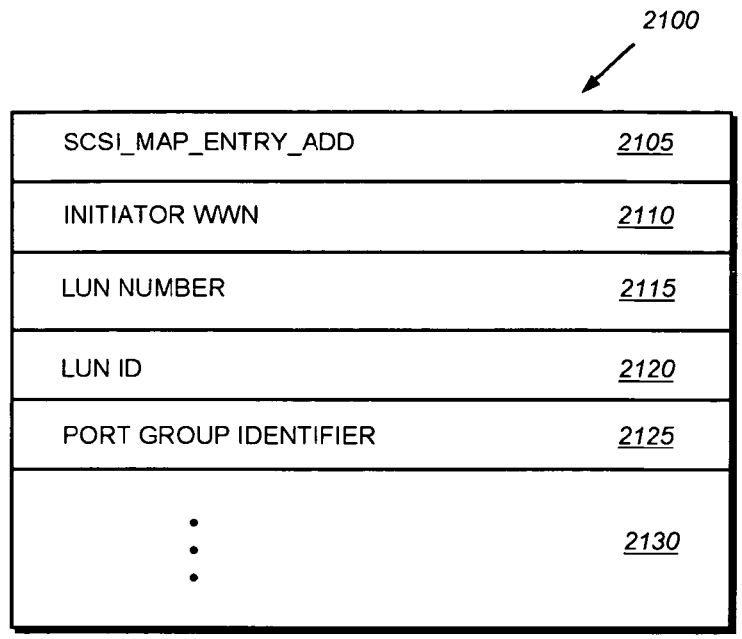
FIG. 21 is a schematic block diagram of an exemplary add map entry operation in accordance with an embodiment of the present invention.

FIG. 21 is a schematic block diagram of an exemplary add map entry operation data structure 2100 in accordance with embodiment of the present invention. The add map entry operation data structure 2100 comprises a SCSI_Map_Entry_Add header 2105, an initiator world wide name (WWN) field 2110, a lun number field 2115, a lun identifier field 2120, a port group identifier field 2125, and, in alternate embodiments, additional fields 2130. The SCSI_Map_Entry_Add header 2105 identifies the operation as an add map entry operation. The initiator WWN field 2110 contains the worldwide name of the initiator to which this map is associated. The lun number field 2115 contains the lun number of the lun that is to be mapped to the initiator identified by the initiator WWN field 2110. The lun identifier field 2120 contains the identification of the lun that is to be exported to the initiator. The port group identifier field 2125 identifies the port group from which the initiator will issue data access operations.

Figure 22:
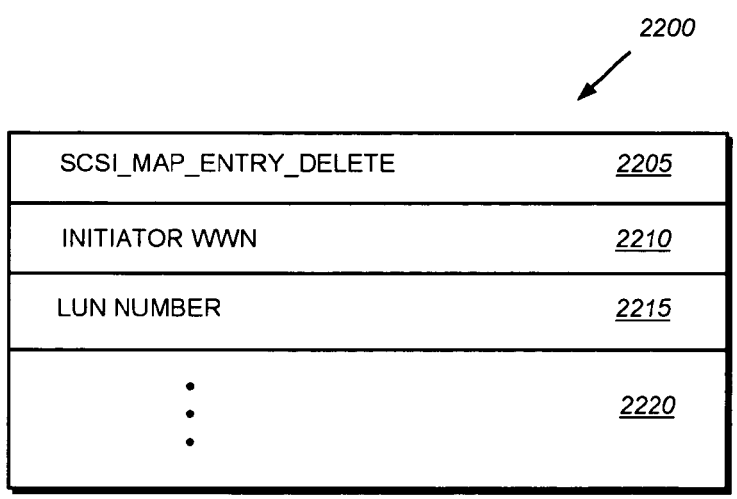
FIG. 22 is a schematic block diagram of an exemplary delete map entry operation data structure in accordance with an embodiment of the present invention.

FIG. 22 is a schematic block diagram of an exemplary delete map entry operation data structure 2200 in accordance with an embodiment of the present invention. The delete map entry data structure 2200 comprises a SCSI_Map_Entry_Delete header 2205, an initiator world wide name (WWN) field 2210, a lun number field 2215, and, in alternate embodiments, additional fields 2220. The SCSI_Map_Entry_Delete header 2205 identifies this operation as a delete map entry operation. The initiator WWN field 2210 contains a worldwide name of an initiator from which this mapping is to be deleted. The lun number field 2215 identifies the lun whose mapping is to be deleted by this operation.

To again summarize, the present invention is directed to a system and method for proxying data access commands between storage systems over a cluster interconnect in a storage system cluster. The storage system cluster comprises a plurality of storage systems, embodied as storage appliances, that are interconnected by a cluster interconnect device. Each storage appliance further coupled to a plurality of disks. In accordance with the present invention, one or more of the storage appliances in the cluster activates a selected port for use in proxying data access commands. This selected proxy port is either a physical fibre channel (FC) port or a virtual port associated with a physical port. Clients of the storage system cluster are configured to use the proxy port as an alternative network path to disks of the cluster.

Upon receiving a command at its proxy port, the local storage appliance performs the appropriate mapping from the received data access command to a file handle for use on the partner storage system. A file-level protocol is utilized across a cluster interconnect to transmit a data access requests to the partner storage appliance. The partner storage appliance performs the desired data access request operation and transmits a response across the cluster interconnect.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. Additionally, any number of virtual ports may be associated with a given physical port. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system configured to proxy a data access command from a first storage system to a second storage system via a cluster interconnect, comprising:

a processor configured to execute a storage operating system of the first storage system, the storage operating system configured to receive a block-level protocol data access command associated with a data container stored on the second storage system, the block-level protocol data access command comprising a block-based identification of the data container, the storage operating system further configured to determine whether to service the block-level protocol data access command based on the block-based identification, the storage operating system further configured to map the block-based identification of the block-level protocol data access command to a file handle associated with the data container, the storage operating system further configured to generate a file-level protocol data access command comprising the file handle, and the storage operating system further configured to transmit the file-level protocol data access command over the cluster interconnect to the second storage system, the second storage system configured as a multi-protocol storage system for servicing, via a local port, both a file-level protocol and a block-level protocol for accessing the data container, and wherein the data container is accessed via the cluster interconnect in response to a failure of the local port.

2. The system of claim 1 wherein the block-level protocol data access command further comprises an initiator address, and wherein the storage operating system is further configured to determine whether to service the block-level protocol data access command based on the initiator address.

3. The system of claim 2 wherein the block-level protocol data access command is selected from a group consisting of iSCSI and FCP.

4. The system of claim 1 wherein the block-level protocol data access command is received at a proxy port associated with the first storage system, and wherein the storage operating system of the first storage system is further configured to receive a mapping operation from the second storage system, the mapping operation comprising an instruction to associate the proxy port with the second storage system.

5. The system of claim 2 wherein access to the data container is only allowed for an initiator associated with the data container.

6. The system of claim 1 wherein the file-level protocol data access command comprises a write operation.

7. The system of claim 1 wherein the data container is exported as a virtual logical unit number (VLUN) from the first storage system.

8. The system of claim 1 wherein the cluster interconnect comprises a fibre channel connection.

9. The system of claim 5 wherein the storage operating system of the first storage system is further configured to receive a mapping operation from the second storage system, the mapping operation comprising an instruction to associate the data container with an initiator name.

10. The system of claim 9 wherein the initiator name comprises a world wide name (WWN).

11. The system of claim 1 wherein the file-level protocol data access command further comprises an offset field, a number of blocks to write field, and a set of data to be written.

12. The system of claim 1 wherein the file-level protocol data access command further comprises an offset field, and a number of blocks to read field.

13. A storage appliance for use in a storage appliance cluster for proxying a data access command received via a cluster interconnect at the storage appliance to a partner storage appliance in the storage appliance cluster, comprising:

a processor operatively connected to the storage appliance and configured to execute a storage operating system, the storage operating system configured to receive a first block-level protocol data access command associated with a data container served by the partner storage appliance, the first block-level protocol data access command comprising a block-based identification of the data container, wherein the first block-level protocol data access command is received at a proxy port associated with the storage appliance, the storage operating system further configured to receive a mapping operation from the partner storage appliance, wherein the mapping operation includes an instruction to associate the proxy port with a world wide name (WNN), the storage operating system further configured to map the block-based identification to a file handle associated with the data container, the storage operating system further configured to transmit the file handle to the partner storage appliance, the partner storage appliance configured to receive the file handle, and the partner storage appliance configured to receive a second block-level protocol data access command, wherein the second block-level protocol data access command is associated with the data container, wherein the second block-level protocol data access command is received at a local port associated with the partner storage appliance, and wherein the data container is accessed via the cluster interconnect in response to a failure of the local port.

14. The storage appliance of claim 13 wherein the block-based identification comprises a world wide port name (WWPN) and a logical unit number identifier.

15. The storage appliance of claim 13 wherein the local port associated with the partner storage appliance is associated with the WNN.

16. The storage appliance of claim 13 wherein the proxy port comprises a virtual port associated with a physical port.

17. A method for proxying data access commands from a first storage system to a second storage system connected via a cluster interconnect, comprising:

receiving at the first storage system a first block-level protocol data access command associated with a data container served by the second storage system, the first block-level protocol data access command comprising a block-based identification of the data container;

receiving at the first storage system a first mapping operation from the second storage system, wherein the first mapping operation comprises a first instruction to associate the data container to a file handle;

mapping at the first storage system the block-based identification to the file handle associated with the data container;

transmitting from the first storage system the file handle and a file-level protocol data access command to the second storage system over the cluster interconnect;

processing at the second storage system the file-level protocol data access command using the file handle;

receiving at the second storage system, via a local port, a second block-level protocol data access command for the data container; and processing at the second storage system the second block-level protocol data access command, and wherein the data container is accessed via the cluster interconnect in response to a failure of the local port.

18. The method of claim 17 wherein the block-based identification comprises a world wide port name (WWPN) and a logical unit number identifier.

19. The method of claim 17 further comprising:

receiving at the first storage system a second mapping operation from the second storage system, the second mapping operation comprising a second instruction to associate a proxy port with the second storage system, wherein the first block-level protocol data access command is received at the proxy port.

20. The method of claim 19 wherein the proxy port comprises a physical port.

21. The method of claim 19 wherein the proxy port comprises a virtual port associated with a physical port.

22. The method of claim 17 wherein the file-level protocol data access command further comprises an offset, a transaction identifier, and a set of data to be written.

23. The method of claim 17 wherein the first block-level protocol data access command and the second block-level protocol data access command are sent via different paths in a network, the network operatively connected to both the first storage system and the second storage system.

24. The method of claim 23 wherein the first block-level protocol data access command further comprises a first destination identifier, wherein the second block-level protocol data access command comprises a second destination identifier, and wherein the first destination identifier differs from the second destination identifier.

25. A computer-readable storage medium containing executable program instructions for execution by a processor, the computer-readable storage medium comprising:

program instructions that receive at a proxy port associated with a first storage system a block-level protocol data access command associated with a data container served by a second storage system, the block-level protocol data access command comprising a block-based identification of the data container, program instructions that export the data container to an initiator associated with a world wide name (WWN), program instructions that map the block-based identification to a file handle associated with the data container; and program instructions that transmit the file handle and a file-level protocol data access command to the second storage system over a cluster interconnect, program instructions that service, via a local port, at the second storage system both a file-level protocol and a block-level protocol for accessing the data container, and wherein the data container is accessed via the cluster interconnect in response to a failure of the local port.

* * * * *

UNITED STATES PATENT AND TRADEMARK OFFICE
CERTIFICATE OF CORRECTION

| | | |
|---|---|---|
| PATENT NO. | : 8,612,481 B2 | Page 1 of 1 |
| APPLICATION NO. | : 12/029264 | |
| DATED | : December 17, 2013 | |
| INVENTOR(S) | : James R. Grier | |

It is certified that error appears in the above-identified patent and that said Letters Patent is hereby corrected as shown below:

In the Specification:
Col. 13, line 41 should read as follows;
-- dance with an embodiment of the present invention. --

Signed and Sealed this
Second Day of September, 2014

Michelle K. Lee
*Deputy Director of the United States Patent and Trademark Office*